Sept. 27, 1966    L. J. BONENFANT ETAL    3,274,663
ELECTRICAL CAPACITOR AND METHOD OF MAKING THE SAME
Filed Sept. 6, 1962
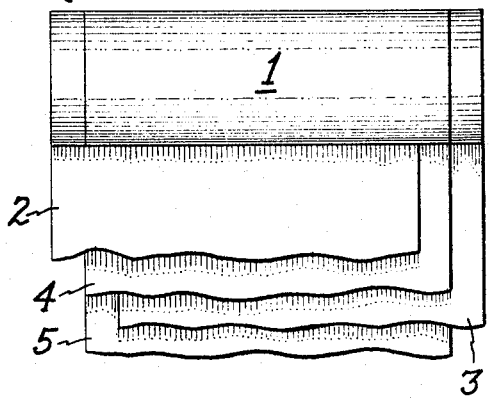
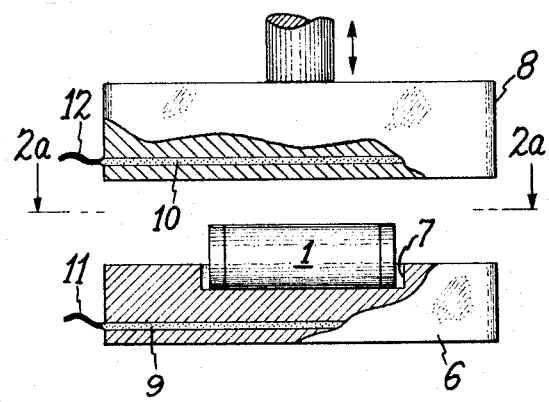
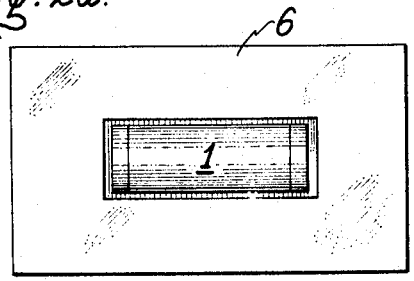
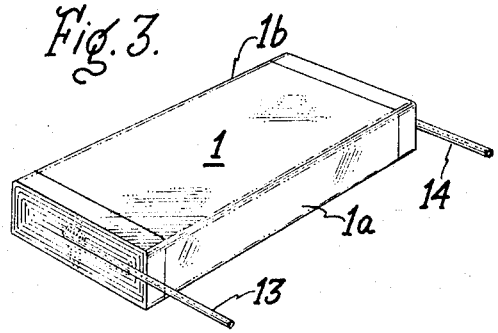
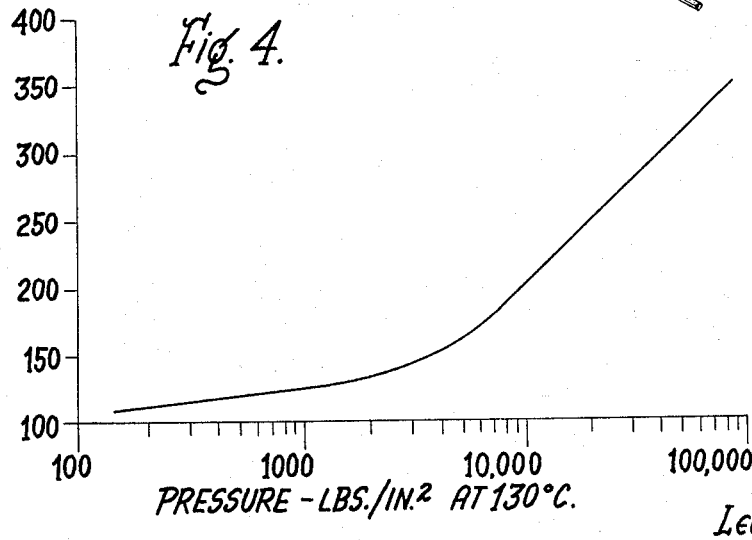
Inventors,
Leo J. Bonenfant,
George T. Thurston,
by Sidney Greenberg
Their Attorney

United States Patent Office 3,274,663
Patented Sept. 27, 1966

3,274,663
ELECTRICAL CAPACITOR AND METHOD OF MAKING THE SAME
Leo J. Bonenfant and George T. Thurston, Hudson Falls, N.Y., assignors to General Electric Company, a corporation of New York
Filed Sept. 6, 1962, Ser. No. 221,779
6 Claims. (Cl. 29—25.42)

The present invention relates to electrical capacitors and more particularly concerns electrical capacitors having a high capacitance per unit volume and an improved process of making the same.

With the advent of miniaturization of electronic circuits, it has become necessary to provide electrical capacitors of considerably reduced size without sacrifice in their electrical properties, such as capacitance, stability of capacitance and power factor. To attain this end, ceramic dielectric capacitors or metallized plastic dielectric capacitors have been employed in the past. However, such capacitors have had certain drawbacks, such as relatively high cost of manufacture, variability in electrical characteristics, such as due to capacitance instability which characterizes many ceramic units and to clearing faults in metallized units during operation, and other difficulties.

It is an object of the invention to provide electrical capacitors of high capacitance per unit volume which avoid the disadvantages of prior art capacitors, and a simple and economical method of making such capacitors.

It is a particular object of the invention to provide a method of considerably increasing the capacitance of electrical capacitors of wound type, and especially wound capacitors of small size suitable for low voltage application.

Other objects and advantages will become apparent from the following description and the appended claims.

With the above objects in view, the present invention in one of its aspects relates to a method of making electrical capacitors which comprises forming a convolutely wound roll comprising an assembly of aluminum foil electrodes separated by dielectric sheets composed of polyethylene terephthalate, and mechanically compressing the thus-formed roll at a pressure of about 10,000 to about 75,000 pounds per square inch at a temperature of about 90° C. to about 220° C. for removing the air in the capacitor roll and reducing the thickness of the dielectric sheets, whereby the capacitance of the wound capacitor roll is substantially increased and the volume of the capacitor is reduced.

The invention will be better understood from the following description taken in conjunction with the accompanying drawing, in which:

FIGURE 1 is a perspective view of a capacitor roll (shown partially unwound) to which the process of the invention may be applied;

FIGURE 2 is a view of pressure apparatus which may be employed for carrying out the method of the invention;

FIGURE 2a is a view of the FIGURE 2 apparatus taken along the lines 2a—2a;

FIGURE 3 is a view of the pressed capacitor roll; and

FIGURE 4 graphically illustrates the improvement in electrical properties of the capacitor provided by the invention.

Referring now to the drawing, and particularly to FIGURE 1, the capacitor treated in accordance with the invention preferably comprises a convolutely wound roll 1 formed of a superposed assembly of a pair of aluminum foil electrodes 2, 3 separated by dielectric sheets 4, 5. The dielectric sheet material is composed of the linear condensation polymer of ethylene glycol and terephthalic acid, of which polyethylene terephthalate is a well-known example and which is available commercially under the trademark Mylar. Foil electrodes 2, 3 are offset laterally with respect to one another and extend beyond the edges of dielectric sheets 4, 5 at opposite sides of the roll to provide an exposed foil arrangement. Suitable lead connections are ultimately made to the exposed foil portions, as shown in FIGURE 3.

In accordance with the invention, the wound capacitor roll 1 is subjected to very high pressures at elevated temperatures so as to result in permanent deformation of the polyethylene terephthalate dielectric sheets. For this purpose pressures in the range of about 10,000 to 75,000 pounds per square inch are employed, at a temperature range of about 90° C. to about 220° C., with an optimum temperature range being 130° C. to 190° C. It has been found that at pressures below about 10,000 lbs./in.$^2$ the dielectric sheet material does not retain the deformation produced therein by such pressures after the pressure is released, whereas at pressures higher than 75,000 lbs./in.$^2$ the flow of the plastic dielectric material is excessive and leads to the occurrence of short circuits in the unit. Similarly, with the applications of temperatures less than 90° C. there is insufficient permanent deformation of the dielectric sheet, whereas at temperatures higher than about 220° C. under the specified pressures the flow of the polyethylene terephthalate is also excessive.

The described process of applying extreme pressure under elevated temperature results in a capacitance increase in the unit of up to 300% of the capacitance of the wound roll before the pressing operation. The improvement appears to be caused by reduction in the dielectric thickness and elimination of the air voids between the electrodes. The process usually results in a 65% decrease in the thickness of the roll as measured in the direction of the applied pressure.

The combination of aluminum foils and polyethylene terephthalate dielectric sheets in a wound unit has proved particularly satisfactory in providing the improved results, whereas other materials and stacked arrangements have not proved satisfactory. It has been found that this combination will withstand the extremely high pressures and elevated temperatures without damage to the aluminum foil while the dielectric sheet undergoes a permanent reduction in thickness of up to 50 to 60%. The polyethylene terephthalate obtained in the commercial form of Mylar sheets which may be used in the invention typically has a thickness of about .00025 inch. The process of the invention results in a final thickness of such sheets in the range of about .00010 inch to .00013 inch. In general, the starting dielectric sheet may have a thickness of between about .00075 inch and .00015 inch. In the wound capacitor roll, the dielectric material between the foils may be constituted by a single sheet or multiple sheets of the polyethylene terephthalate.

FIGURE 2 illustrates a pressure apparatus which may be used in practicing the invention and which comprises a fixed platen 6 having a rectangular recess 7 therein for receiving the wound capacitor roll 1 and vertically movable platen 8 capable of pressing against the capacitor roll with the above-specified pressures. Platens 6 and 8, typically of steel, are heated by electrical heating elements 9 and 10 embedded therein and connected to a suitable source of current by leads 11 and 12, or by any other suitable means for producing the elevated temperatures required in the process. Recess 7 in the lower platen 6 preferably is shaped to conform generally to that of the pressed capacitor so as to confine the capacitor during the pressing operation. FIGURE 2a is a plan view of lower platen 6 showing the preferred dimensions of recess 7 with relation to capacitor 1. As shown, the width of recess 7 is such that the side walls of the recess provide lateral abutment to the curved sides of roll 1, whereas the end walls are appreciably spaced from the exposed foil ends of roll 1 to prevent similar abutment against the latter ends during the pressing operation. By virtue of this arrangement, the curved sides of roll 1 are adequately supported during the pressing operation and thereby avoid the risk of being ruptured at the extremely high pressure levels, and, in addition, the flattening of the curved sides of roll 1 which thereby occurs contributes further increased capacitance for the unit.

FIGURE 3 is a perspective view of the compressed capacitor 1 after removal from the pressing apparatus and after leads 13 and 14 have been welded to the opposite exposed foil ends. During the pressing operation the roll tends to elongate somewhat in the recess 7 in the direction of its axis, while the curved sides become flattened as mentioned above, to produce the characteristic rectangular shape with flat sides 1a, 1b as shown in FIGURE 3. The pressed capacitor 1 is ultimately preferably encased in a casing of suitable material (not shown) such as a pre-molded synthetic resin insulating material, or is otherwise encapsulated or sealed in accordance with known methods.

While preferably the wound capacitor unit is subjected to pressure while confined in a recess as described, the invention also contemplates such pressure treatment of the roll while unconfined, that is, lying simply between two flat pressure platens. When unconfined, it appears that the capacitor roll will not withstand as high a pressure as in the case where the roll is confined in a recess as described. The reason for this apparently is that the roll tends to rupture more readily at its curved sides under the severe pressures applied.

FIGURE 4 graphically shows the typical improvement in capacitance in the described capacitors produced by the present process. In the graph, the percentage increase in capacitance over the original capacitance is plotted against the pressure in pounds per square inch at 130° C., the latter values being on a logarithmic scale. As apparent from the curve in the graph, relatively little increase in capacitance is obtained with increasing pressure until about 5,000 lbs./in.² is reached, after which further pressure increase at the stated temperature is attended by markedly increased capacitance, up to as much as a three-fold increase.

In an illustrative process carried out in accordance with the invention, two sheets of aluminum foil .00025 inch thick interleaved with two sheets of polyethylene terephthalate film .00025 inch thick were wound into a capacitor roll having .033 microfarad capacitance. The wound roll was then placed between platens of a hydraulic press heated at 130° C. without confining the sides of the roll. The roll was subjected to a pressure of about 40,000 pounds per square inch for about two hours at the aforementioned temperature. After the unit was removed from the pressure apparatus and subjected to a temperature of 130° C. for 16 hours in an oven for the purpose of heat shrinking the unit, the capacitance was determined to be about .100 microfarad, which was about three times the capacitance of the original unit. Leads were joined by percussive welding to the exposed aluminum foils and the unit was inserted into an epoxy resin shell, with the leads projecting through an open end, and the opening was then potted with epoxy resin which was then cured for 16 hours at 125° C.

Tests made on capacitors treated in accordance with the described process have shown that the process does not adversely affect the capacitance stability or power factor of the units over a wide range of temperature.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. The method of making an electrical capacitor which comprises forming a wound roll of a superposed assembly of a pair of aluminum foil electrodes separated by polyethylene terephthalate dielectric sheets, and subjecting said wound roll to a pressure of about 10,000 to 75,000 pounds per square inch at a temperature of about 90° C. to 220° C. for reducing the thickness of said dielectric sheets and removing the air between said electrodes, whereby the capacitance of the capacitor is increased and the volume of the capacitor is reduced.

2. The method of making an electrical capacitor which comprises forming a wound roll of a superposed assembly of a pair of aluminum foil electrodes separated by polyethylene terephthalate dielectric sheets, and subjecting said wound roll to a pressure of about 10,000 to 75,000 pounds per square inch at a temperature of about 130° C. to 190° C. for reducing the thickness of said dielectric sheets and removing the air between said electrodes, whereby the capacitance of the capacitor is increased and the volume of the capacitor is reduced.

3. The method of making an electrical capacitor which comprises forming a wound roll of a superposed assembly of a pair of aluminum foil electrodes separated by polyethylene terephthalate dielectric sheets, and mechanically compressing said wound roll in a press having heating means associated therewith for subjecting said wound roll to a pressure of about 10,000 to 75,000 pounds per square inch at a temperature of about 130° to 190° C. for reducing the thickness of said dielectric sheets and removing the air between said electrodes, whereby the capacitance of the capacitor is increased and the volume of the capacitor is reduced.

4. The method of making an electrical capacitor which comprises forming a wound roll of a superposed assembly of a pair of aluminum foil electrodes separated by polyethylene terephthalate dielectric sheets having a thickness of about .00015 to .00075 inch, and mechanically compressing said wound roll in a press having heating means associated therewith for subjecting said wound roll to a pressure of about 10,000 to 75,000 pounds per square inch at a temperature of about 130° C. to 190° C. for reducing the thickness of said dielectric sheets by about 50 to 60 percent and removing the air between said electrodes, whereby the capacitance of the capacitor is increased and the volume of the capacitor is reduced.

5. The method of making an electrical capacitor which comprises forming a wound roll of a superposed assembly of a pair of aluminum foil electrodes separated by polyethylene terephthalate dielectric sheets having a thickness of about .00015 to .00075 inch, and mechanically compressing said wound roll in a press having heating means associated therewith for subjecting said wound roll to a pressure of about 10,000 to 75,000 pounds per square inch at a temperature of about 130° C. to 190° C. while confining the curved sides of said wound roll for reducing the thickness of said dielectric sheets to by about 50 to 60 percent and removing the air between said electrodes, whereby the capacitance of the capacitor is increased and the volume of the capacitor is reduced.

6. An electrical capacitor as made by the method defined in claim 1.

References Cited by the Examiner
UNITED STATES PATENTS 2,934,811    5/1960    Wellington _____ 29—25.42
3,084,415    4/1963    Dokuchitz _____ 29—25.42

RICHARD H. EANES, Jr., *Primary Examiner.*